P. EDTBAUER.
AUTOMATIC WEIGHING MACHINE.
APPLICATION FILED AUG. 27, 1908.
945,767.
Patented Jan. 11, 1910.
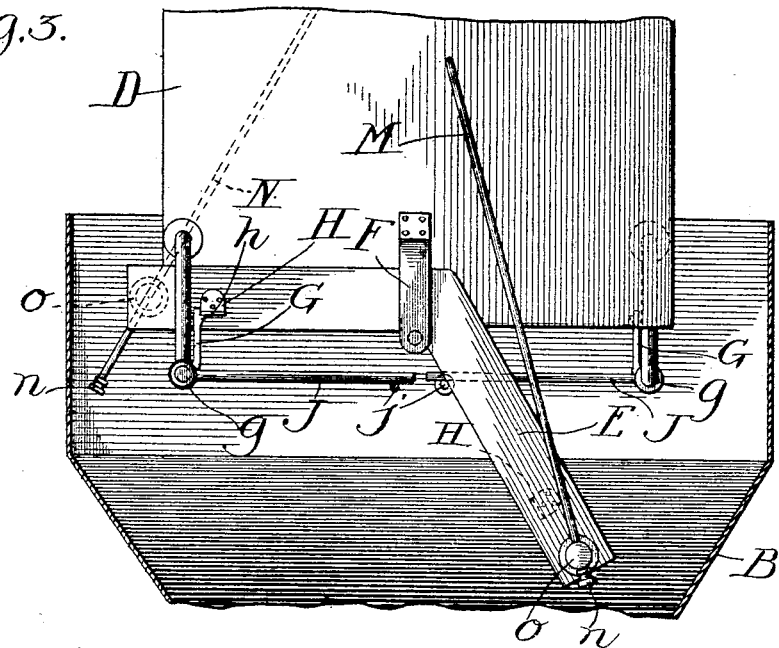
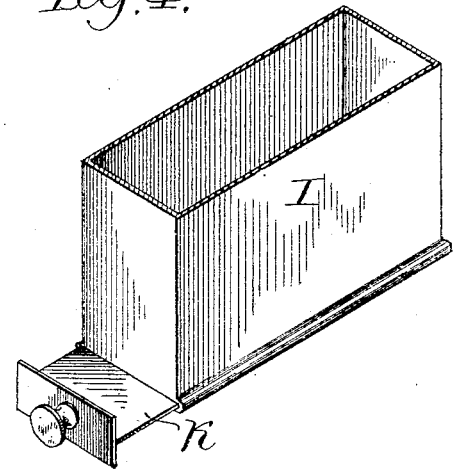
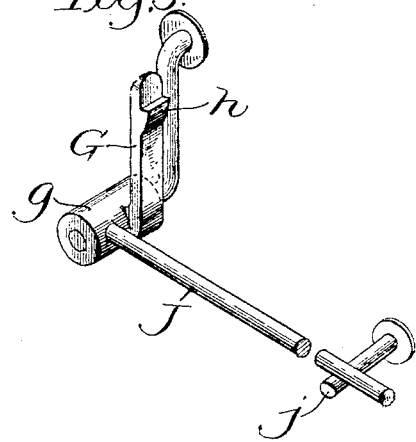
Witnesses
Inventor
Petronella Edtbauer
by Frank D. Thomason
Atty

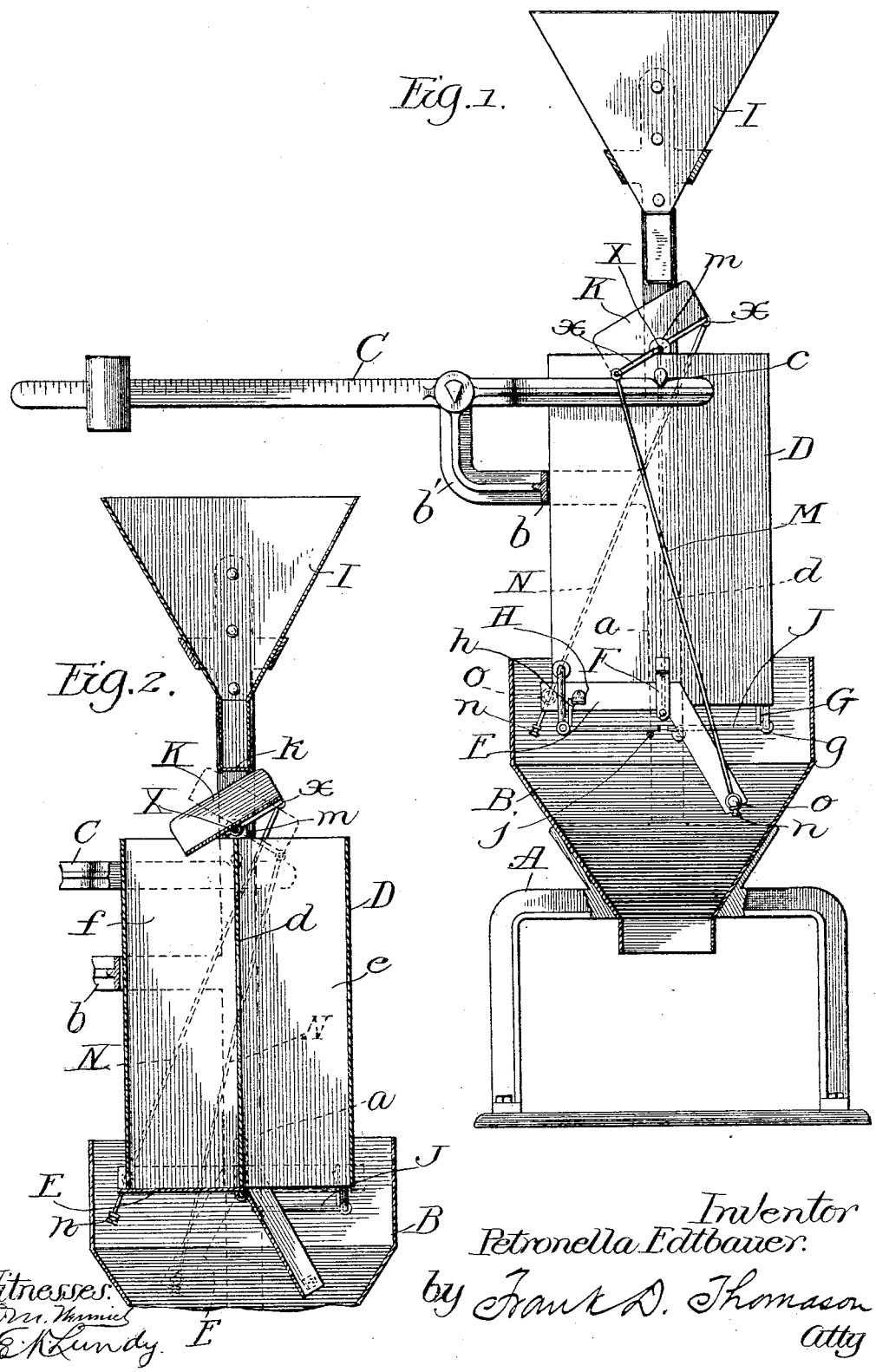

UNITED STATES PATENT OFFICE.

PETRONELLA EDTBAUER, OF CHICAGO, ILLINOIS.

AUTOMATIC WEIGHING-MACHINE.

945,767. Specification of Letters Patent. Patented Jan. 11, 1910.

Application filed August 27, 1908. Serial No. 450,563.

*To all whom it may concern:*

Be it known that I, PETRONELLA EDTBAUER, a citizen of the United States, and a resident of Chicago, in the county of Cook and State of Illinois, have invented certain new and useful Improvements in Automatic Weighing-Machines, of which the following is a clear, full, and exact description.

My invention relates to weighing machines, and particularly to automatic weighing machines.

The object of my invention is to provide a weighing machine, which will automatically and correctly weigh a desired commodity, just as long as any of said commodity remains in the hopper of the machine, and which can be made to do this weighing just as fast or as slow, as desired, according to the speed of the operator in removing and replacing the bag, carton, or other package into which the weighed commodity is deposited below the discharge chute of the machine. This I accomplish by the means hereinafter fully described, and as particularly pointed out in the claims.

In the drawings:—Figure 1 is a side elevation of my invention showing a portion of the supporting frame and the funnel of the machine in section. Fig. 2 is a vertical section of the upper part of the same. Fig. 3 is a fragmentary view of the lower part of the weighing receptacle and upper part of the funnel, drawn to a larger scale. Fig. 4 is a perspective view of the lower end of the hopper. Fig. 5 is a detail showing in perspective the tripping mechanism for the rocking bottom of the weighing receptacle.

Referring to the drawings, A represents a suitable supporting frame whose legs are so constructed that they support a funnel B at such a distance above a base-plate, to which the feet of said legs are secured, that a bag or other package can be conveniently placed beneath the same to catch the discharge of the commodity therefrom. Two uprights *a*, *a*, arise, diametrically opposite each other from the seat of the funnel, and, at a suitable point above the same, a horizontal U-shaped yoke *b* connects said uprights. At its center of length this yoke *b* has an L-shaped arm *b'* projecting therefrom, in the upper bifurcated end of the vertical branch of which, a balance beam C is fulcrumed. The longer outwardly extending branch of this beam C is graduated and has an adjustable balance weight thereon, and the end of said beam, extending between said uprights, is bifurcated and has the weighing receptacle D suspended therefrom by means of knife-edged trunnions *c*, preferably in the same vertical plane as said uprights. Receptacle D, is, preferably rectangular in horizontal section, and it is of such length that its lower end extends down into the upper open end of the funnel B. This receptacle D is provided with a vertical partition *d*, arranged in the vertical plane of its trunnions and dividing the interior into two corresponding compartments, *e* and *f*. The lower end of these compartments are alternately opened and closed by a cradle E, which consists of two troughs arranged at a suitable obtuse angle to one another, and journaled at the angle of their bottoms in bearings in the lower ends of hangers F, in a transverse plane just below the lower edges of the partition, which latter terminate in the same horizontal plane as the lower edges of the weighing receptacle. This construction of the cradle E is such that, when it has rocked to the limit of its movement in one direction, it will close the lower end of compartment *f* and open the lower end of compartment *e*, and when it moves to the limit of its movement in the opposite direction it will close the lower end of compartment *e* and open that of *f*. Now when either of said compartments is closed, the cradle is retained in the proper position to keep said compartment closed until the necessary quantity of the commodity has fallen into and accumulated in the same to over-balance the weight in the graduated arm of the balance beam, by means of a suitable tripping device. This tripping device, (shown in detail in Fig. 5 of the drawings) consists of a boss *g*, which is journaled on the lower horizontal portion of a hanger, secured to and depending from the lower end of the front of the weighing receptacle, near one side thereof. This hanger passes down outside of the side walls of the adjacent trough of the cradle, and the boss *g* has an arm G projecting upward therefrom, which, near its upper end is provided with a shoulder *h* that projects toward the journal of the cradle, and, is adapted to be engaged by a lug H, secured to and projecting from the side-wall of the adjacent trough of the same, when the trough to which it is attached is closed up against the compartment of the weighing receptacle with which it is designed to coöperate. Boss $g$ also has an arm J projecting horizontally therefrom, which extends about to the vertical plane of the pivot of the cradle and has its end rest upon a pin $j$ secured to and projecting from the inner surface of the upper end of the funnel B.

Now when the compartment, whose lower end is closed, receives a sufficient quantity of the commodity to counter balance the weighted arm of the beam C, the receptacle D moves downward, and arm J is caused by pin $j$ to move sufficient to make the shoulder of arm G move out from under the lug H and permit the loaded trough of the cradle to drop to the limit of its downward movement and discharge its contents into the funnel, and at the same time make the other trough of the cradle close the other compartment.

There is another tripping device, similar in every respect to that just described, located diametrically opposite thereto and secured to the near side of the weighing receptacle and when the last mentioned trough of the cradle closes the compartment with which it coöperates, it is caught and retained in its closed position until the weighing receptacle again moves downward, whereupon it discharges its load, and so on.

The uprights $a, a$, of the supporting-frame extend up above the weighing receptacle a suitable distance, and have a suitable hopper I secured to and between their upper ends. The lower contracted discharge end of this hopper is made longer in the direction of the vertical plane of the partition $d$ of said receptacle, and the extent of its discharge opening is controlled by means of a slide bottom $k$, which is movable horizontally in and out in the vertical plane of the partition $d$, so as to regulate the flow of the commodity from the hopper and permit it to fall so that if it were not intercepted it would distribute itself equally on both sides of said partition. Between the lower end of said hopper, and the upper end of the weighing receptacle, there is a rocking chute, K, which is pivoted at its center of the length just below its bottom to and between lugs $m, m$, projecting up from the upper edges of the weighing receptacle at each end of the partition. This chute automatically tilts toward and discharges into first one and then the other closed compartment of the weighing receptacle. This I accomplish by means of rods M, N, whose upper ends are pivotally connected to transverse arms $x$ on the extended ends of the rock shaft X on which the rocking chute is mounted, and which extend downward and pass through openings in studs $o, o$, projecting transversely from the end of the cradle on the opposite side of the vertical plane of the partition $d$, substantially as shown in the drawings.

The rods M and N extend through the studs $o$ such a distance that when the end of the trough of the cradle to which each is connected is lowermost the head $n$ on the lower end thereof will bear against said stud. The result of this construction is that the rocking chute continues to discharge into the compartment for a short period of time after the latter commences to discharge, and then the stud projecting from the downwardly moving trough engages the head on the lower end of its coöperating rod and tilts the rocking chute in the opposite direction and causes it to discharge into the other compartment at about the moment the latter is closed.

The operation of my invention is as indicated in the foregoing description. While I prefer the construction thereof to be as described, yet it can be changed in minor particulars without departing from the spirit of my invention.

What I claim as new is:—

1. A weighing machine comprising a vertically movable weighing receptacle provided with two vertical compartments, a rocking cradle adapted to automatically close the lower end of one compartment and open the lower end of the other each time said receptacle moves downward, pivoted bosses projecting laterally from the lower end of said receptacle, vertical arms projecting from said bosses having shoulders on which said cradle rests, rods projecting horizontally from said bosses, and stationary means independent of the cradle and weighing receptacle upon which the free ends of said rods rest.

2. A weighing machine comprising a vertically movable weighing receptacle provided with two vertical compartments, a rocking cradle adapted to automatically close the lower end of one compartment and open the lower end of the other each time said receptacle moves downward, pivoted bosses projecting laterally from the lower end of said receptacle, vertical arms projecting from said bosses having shoulders on which said cradle rests, elongated rods projecting horizontally from said bosses toward the pivot of said cradle, and stationary means independent of the cradle and weighing receptacle upon which the free ends of said rods rest.

3. A weighing machine comprising a vertically movable weighing receptacle provided with two vertical compartments, a rocking cradle adapted to automatically close the lower end of one compartment and open the lower end of the other each time said receptacle moves downward, angular shaped arms projecting laterally from the lower end of said receptacle, bosses pivotally mounted on the horizontal portions of said arms, vertical arms projecting from said bosses having shoulders on which said cradle rests, rods projecting horizontally from said bosses, and stationary means independent of the cradle and weighing receptacle upon which the free ends of said rods rest.

4. A weighing machine comprising a vertically movable weighing receptacle provided with two vertical compartments, a rocking cradle adapted to automatically close the lower end of one compartment and open the lower end of the other each time said receptacle moves downward, angular shaped arms projecting laterally from the lower end of said receptacle, bosses pivotally mounted on the horizontal portions of said arms, vertical arms projecting from said bosses having shoulders on which said cradle rests, elongated rods projecting horizontally from said bosses toward the pivot of said cradle, and stationary means independent of the cradle and weighing receptacle upon which the free ends of said rods rest.

5. A weighing machine comprising a vertically movable weighing receptacle provided with two vertical compartments, a rocking cradle adapted to automatically close the lower end of one compartment and open the lower end of the other each time said receptacle moves downward, pivoted bosses projecting laterally from the lower end of said receptacle, vertical arms projecting from said bosses having shoulders on which said cradle rests, rods projecting horizontally from said bosses, and stationary means independent of the cradle and weighing receptacle upon which the free ends of said rods rest, and a rocking chute above said receptacle and coöperating with said cradle for automatically directing the falling commodity into first one closed compartment and then into the other.

6. A weighing machine comprising a vertically movable weighing receptacle provided with two vertical compartments, a rocking cradle adapted to automatically close the lower end of one compartment and open the lower end of the other each time said receptacle moves downward, pivoted bosses projecting laterally from the lower end of said receptacle, vertical arms projecting from said bosses having shoulders on which said cradle rests, elongated rods projecting horizontally from said bosses toward the pivot of said cradle, and stationary means independent of the cradle and weighing receptacle upon which the free ends of said rods rest, and a rocking chute above said receptacle and coöperating with said cradle for automatically directing the falling commodity into first one closed compartment and then into the other.

7. A weighing machine comprising a vertically movable weighing receptacle provided with two vertical compartments, a rocking cradle adapted to automatically close the lower end of one compartment and open the lower end of the other each time said receptacle moves downward, angular shaped arms projecting laterally from the lower end of said receptacle, bosses pivotally mounted on the horizontal portions of said arms, vertical arms projecting from said bosses having shoulders on which said cradle rests, rods projecting horizontally from said bosses, and stationary means independent of the cradle and weighing receptacle upon which the free ends of said rods rest, and a rocking chute above said receptacle and coöperating with said cradle for automatically directing the falling commodity into first one closed compartment and then into the other.

8. A weighing machine comprising a vertically movable weighing receptacle provided with two vertical compartments, a rocking cradle adapted to automatically close the lower end of one compartment and open the lower end of the other each time said receptacle moves downward, angular shaped arms projecting laterally from the lower end of said receptacle, bosses pivotally mounted on the horizontal portions of said arms, vertical arms projecting from said bosses having shoulders on which said cradle rests, elongated rods projecting horizontally from said bosses toward the pivot of said cradle, and stationary means independent of the cradle and weighing receptacle upon which the free ends of said rods rest, and a rocking chute above said receptacle and coöperating with said cradle for automatically directing the falling commodity into first one closed compartment and then into the other.

9. A weighing machine comprising a vertically movable weighing receptacle provided with two vertical compartments, a rocking cradle adapted to automatically close the lower end of one compartment and open the lower end of the other each time said receptacle moves downward, pivoted bosses projecting laterally from the lower end of said receptacle having shoulders on which said cradle rests, rods projecting horizontally from said bosses, stationary means for supporting the free ends of said rods, a rocking chute having the ends of its shaft bent laterally above said receptacle, and rods having one of their ends secured to the bent ends of said shaft and their opposite ends have sliding connection with the outer ends of said cradle.

10. A weighing machine comprising a vertically movable weighing receptacle provided with two vertical compartments, a rocking cradle adapted to automatically close the lower end of one compartment and open the lower end of the other each time said receptacle moves downward, pivoted bosses projecting laterally from the lower end of said receptacle having shoulders on which said cradle rests, rods projecting horizontally from said bosses, stationary means for supporting the free ends of said rods, a rocking chute having the ends of its shaft bent laterally above said receptacle, and rods having one of their ends secured to the bent ends of said shaft and their opposite ends adjustably engage and have sliding connection with the outer ends of said cradle.

In testimony whereof I have hereunto set my hand and seal this 24th day of August, A. D., 1908.

PETRONELLA EDTBAUER. [L. S.]

Witnesses:
 EDMUND EDTBAUER,
 E. N. LUNDY.